US006335997B1

(12) United States Patent
Lee et al.

(10) Patent No.: US 6,335,997 B1
(45) Date of Patent: Jan. 1, 2002

(54) DEVICE AND METHOD FOR ATTENUATING A LOW-LEVEL LIGHT SOURCE OVER A VERY WIDE DYNAMIC RANGE

(76) Inventors: John T. S. Lee; Dora S. T. Lee, both of 107 Midsummer Dr., Gaithersburg, MD (US) 20878

( * ) Notice: Subject to any disclaimer, the term of this patent is extended or adjusted under 35 U.S.C. 154(b) by 0 days.

(21) Appl. No.: 09/420,201

(22) Filed: Oct. 18, 1999

(51) Int. Cl.$^7$ ................................................. G02B 6/00
(52) U.S. Cl. ...................................................... 385/140
(58) Field of Search ................................ 385/140, 147, 385/27, 28

(56) References Cited

U.S. PATENT DOCUMENTS 5,946,435 A * 8/1999 Zheng et al. ................. 385/47
6,205,280 B1 * 3/2001 Wagoner et al. ............ 385/140

* cited by examiner

*Primary Examiner*—Frank G. Font
*Assistant Examiner*—Michael P. Stafira

(57) ABSTRACT

A device and method for attenuating a low-level light source over a very wide dynamic range is disclosed.

The device comprises a light source, a plurality of fiber optic means, a plurality of opaque tubes, and a specifically designed block with a light tight chamber and a plurality of output apertures connected to the chamber through drilled tunnels.

The fiber optic means are inserted into the tunnels connecting the light tight chamber and the output apertures, so the end of the fiber optic means are visible through the output apertures, while the long part of the fiber optic means are exposed to the light source in the chamber.

The opaque tubes are inserted over the fiber optic means to control the amount of light allowed to hit the fiber optic means. The amount of light collected by the fiber optic means can be adjusted by moving the opaque tube sleeve so as to cover part of the fiber optic means. The light emitted at the end of the fiber optic means, visible through the output apertures, are approximately proportional to the light collected along the exposed length.

15 Claims, 3 Drawing Sheets

DEVICE AND METHOD FOR ATTENUATING A LOW-LEVEL LIGHT SOURCE OVER A VERY WIDE DYNAMIC RANGE

TECHNICAL FIELD

The present invention generally relates to a device and method to generate stable multi level low light sources, and more particularly a device and method for attenuating a low level light source using fiber optic means as light conductors, and opaque sleeves means for controlling the amount of light collected by the fiber optic means.

BACKGROUND OF THE INVENTION

Presently, the way to generate a series of low light source that varies by over 5 or more decades of dynamic range involves the preparation of serial dilutions of several types of chemiluminescence reagent. In such procedures, typically, the serially diluted luminescent or the light-emitting substances are deposited in a plurality of wells.

This method is not very accurate because the light generated by the chemiluminescence reaction depends on many factors, such as the age and the strength of the reagents, the accuracy in mixing the reagents, the time lapse between the mixing and the time the reagent is actually read, the temperature of the mix, etc.

Furthermore, the chemiluminescence reaction only lasts a very limited amount of time, and the kinetic of the of the reactions varies over time, making an accurate measurement/calibration very difficult. Moreover, it takes a long time and a lot of effort to prepare the mix.

Therefore, there is a need in the industry, for a device and method for generating a series of stable low-level light sources, for use in conjunction with instruments such as luminometers, fluorometer or other instruments, capable of reading very low-level of lights over a range of 5 or more decades The availability of such device, will enable the user to verify the sensitivity, linearity, accuracy and dynamic range of the instruments, anytime it is needed.

It will also enable the manufacturer to perform calibration and test of their instruments during production, or conduct performance verification in the field.

Other arangements representative of the prior art are disclosed in the following U.S. Pat. Nos. 5,657,118; 5,715,048; 5,112,134; 5,233,180; and 5,307,145.

DISCLOSURE OF INVENTION

The present invention generally relates to a device and method for the generation of a series of stable low-level light sources for the purpose of calibration and performance verification of light detection instrumentation. Low-level light in this case means at or below the visibility threshold of the naked eye.

In accordance with the present invention, a device for the generation of a series of very low level light sources, comprises a light source and associated circuitry for providing feedback control, fiber optic means for conducting light from the source to their respective output apertures, opaque sleeve means for controlling the amount of light to be conducted by each individual fiber optic means, and the body with a light tight chamber, a plurality of output apertures, a plurality tunnels for fiber optic means and a plurality tunnels for the opaque sleeves.

In accordance with a preferred embodiment of the invention, the light source can be:

1. A naturally glowing substance such as tritium, which has a half-life of 12 years, and has a very predictable decay curve.
2. An electronic feedback controlled light source capable of maintaining a constant level of light output for the life of the device.
3. Combination of both 1 and 2, whereby the naturally glowing source in conjunction with a decay table is used as a stable absolute reference, and the electronically controlled light is used for sensitivity and linearity test.

The fiber optic means are employed to conduct light from the light source cavity to the output apertures, visible to the outside, therefore visible to the reading instrument.

The opaque sleeve means are inserted over the fiber optic means for controlling the amount of light to be conducted by the fiber optic means to the output apertures.

Therefore, it is a primary objective of the present invention to provide a device and method for the generation of a series of very low level light sources ranging over several orders of magnitude.

It is an additional objective of the present invention to provide a device and method for the generation of a series of very low level light sources, wherein the light source is a constant light source in the form of a naturally glowing substance such as tritium, an electronic light source with feedback control to provide constant light output, or, a combination thereof.

It is an additional objective of the present invention to provide a device and method for the generation of a series of very low level light sources, wherein the light from the light source is conducted to the output apertures by fiber optic means.

It is an additional objective of the present invention to provide a device and method for the generation of a series of very low level light sources, wherein the fiber optic means can be any type of fiber optic means, such as fiber optic rods, light pipes, fiber optic strands or fiber optic bundles.

It is an additional objective of the present invention to provide a device and method for the generation of a series of very low level light sources, wherein the amount of light conducted by the fiber optic means are controlled by opaque sleeves which cover part of the fiber optic means.

It is an additional objective of the present invention to provide a device and method for the generation of a series of very low level light sources, wherein the amount of light conducted by the fiber optic means can be optimized by cutting the end of the fiber optic means at a certain angle, by scoring or roughing the longitudinal surface of the fiber optic means, or by combination thereof.

The above and other objectives, and nature of the invention will be more clearly understood by reference to the following detailed description, the appended claims, and the accompanying drawings.

BEST MODE FOR CARRYING OUT THE INVENTION

The device of present invention can be made in a variety of formats, depending on its intended use. The number of output apertures/fiber optic means/sleeve can be tailored to the user's requirements, within practical limits.

For the purpose of illustration, in this document, a device with seven output apertures, which will provide seven levels of light sources will be described in more detail with reference to the various figures of the drawings.

Figure 1:
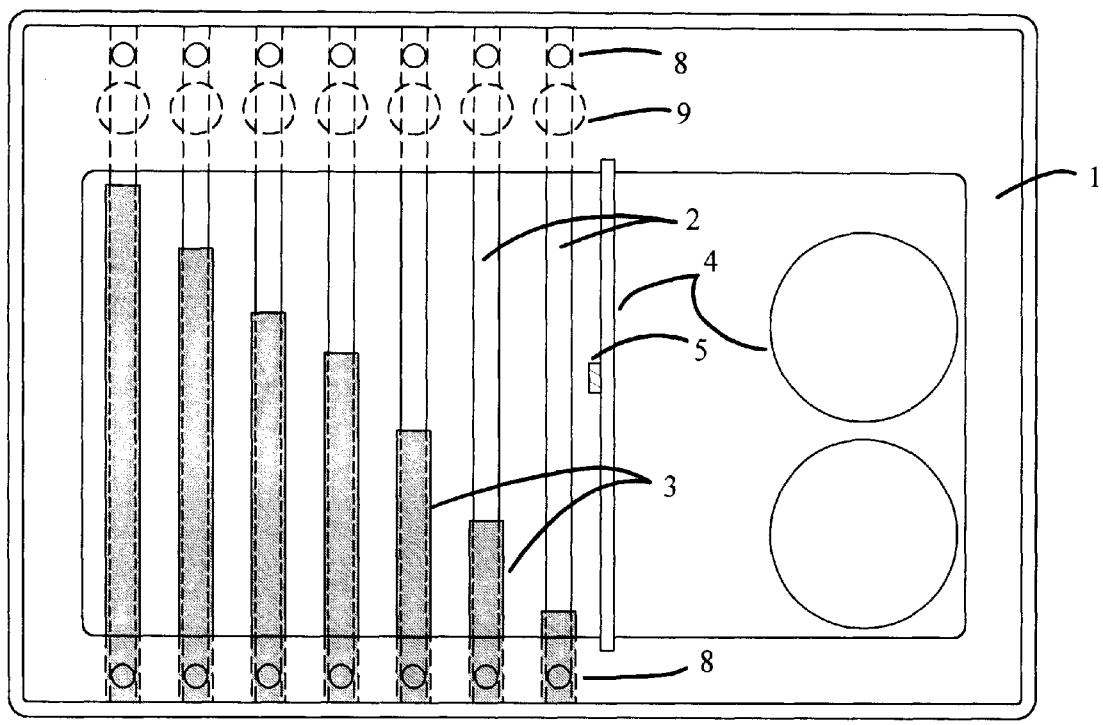
FIG. 1 is a top view of the device of the present invention
Figure 2:
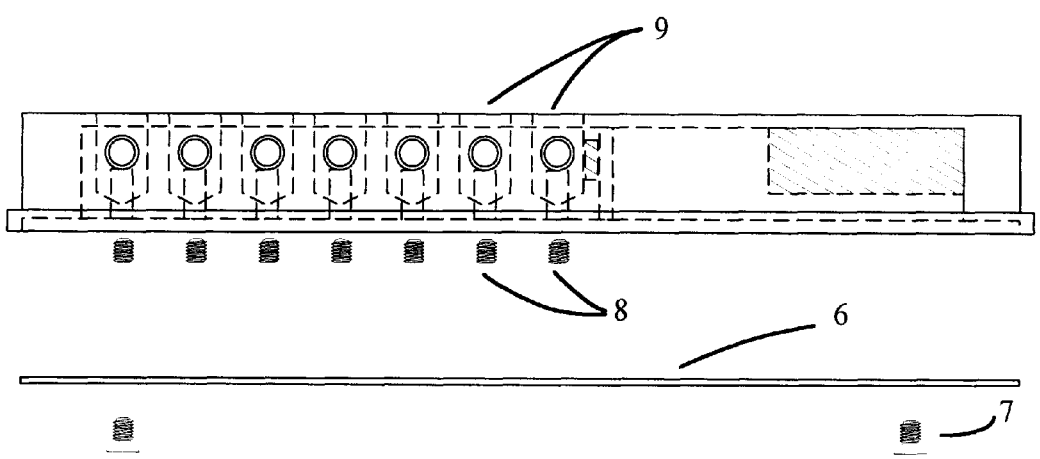
FIG. 2 is a side view of the device of the present invention
Figure 3:
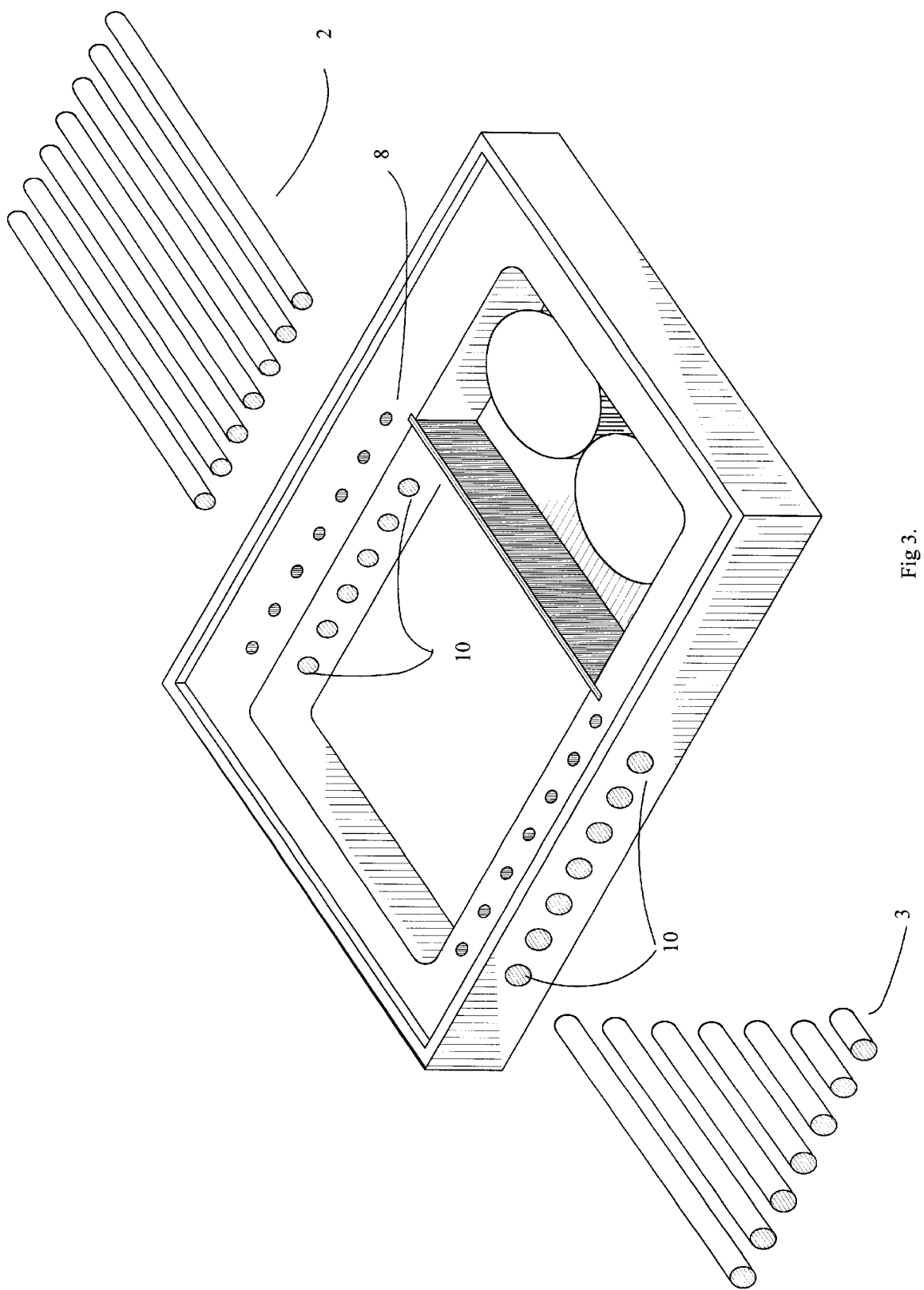
FIG. 3 is a perspective bottom view of the device of the present invention
Figure 4:
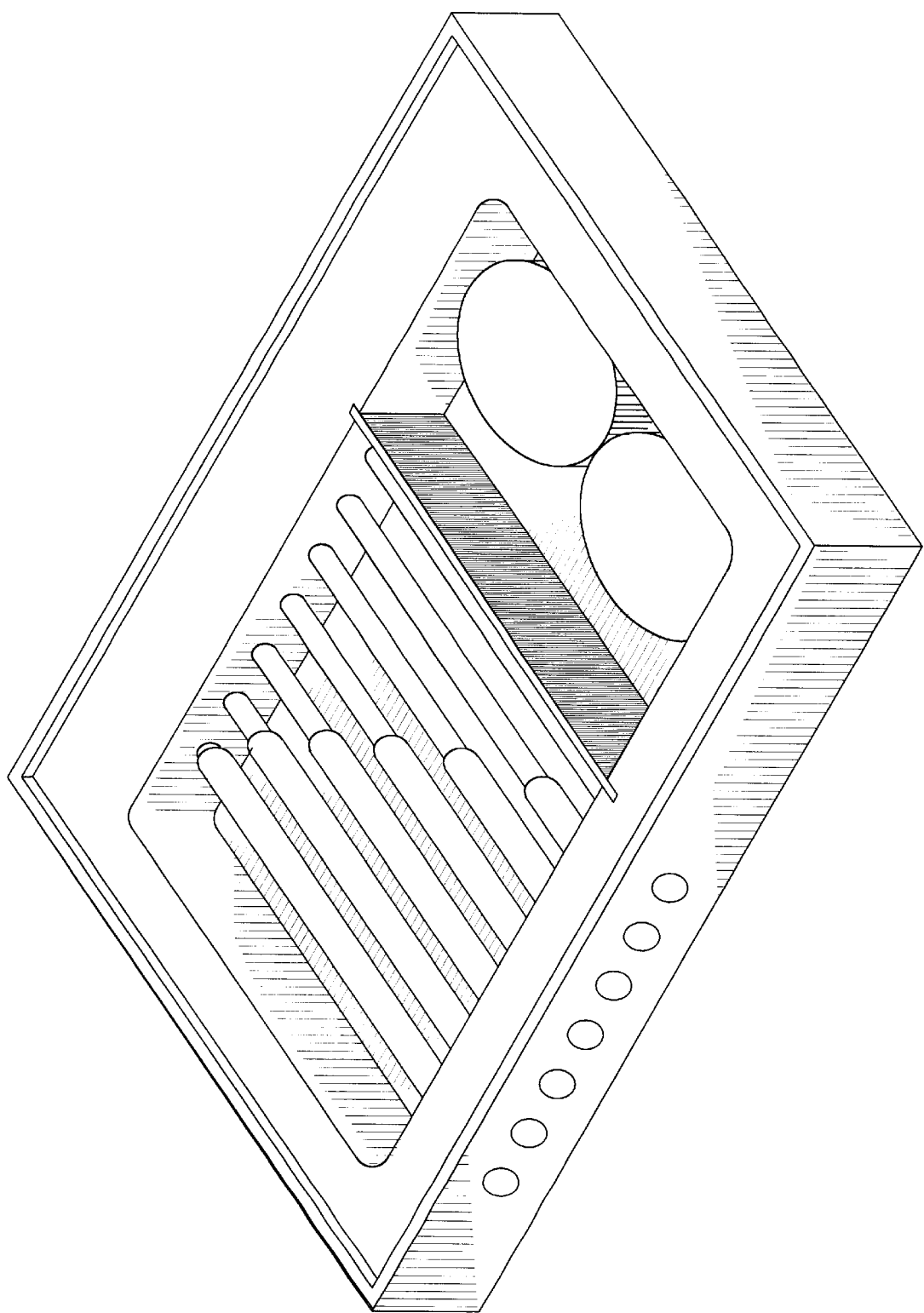
FIG. 4 is an exploded perspective bottom view of the device of the present invention.

FIG. 1, is a top view of the device of the present invention. As seen therein, the present invention comprises the following primary elements: body 1, fiber optic means 2, opaque sleeves 3, electronics 4, light source 5, bottom plate 6, bottom plate screws 7, set screws 8, output apertures 9, tunnels 10.

The device is assembled by inserting the fiber optic means in their tunnels so that one end of the fiber optic means is visible through the output apertures. These fiber optic means are then secured to the body by tightening the corresponding set screws. The opaque sleeves are inserted from the opposite side, to cover certain length of the fiber optic means. It is preferred to let the fiber optic means closest to the light source be the brightest fiber optic means, and subsequent fiber optic means are progressively attenuated. The length of the fiber optic means covered by the sleeve determines the amount of light emitted at the emitting end of it, exposed to the output aperture. If precise calibration is required, the opaque sleeves can be slipped in or out while a reading is made at the corresponding aperture. Once the desired reading is obtained, the sleeve can be fixed in place by tightening the corresponding set screw. The excess sleeve can then be cut flush to the body.

What is claimed is:

1. A device for the generation of a series of very low level light sources ranging over several orders of magnitude, comprising:

main body means with a light tight chamber and a series of output apertures connected to the chamber through drilled tunnels;

constant light source means, for generating the light to be attenuated, mounted inside the light tight chamber;

fiber optic means for collecting and conducting attenuated light from the light tight chamber to the output apertures;

opaque sleeves means for controlling the attenuation of light to be conducted by the fiber optic means.

2. The device of claim 1, wherein the main body means has a light tight chamber.

3. The device of claim 2, wherein the main body means has a plurality of output apertures.

4. The device of claim 3, wherein the plurality of output apertures are connected to the light tight chamber through a plurality of tunnels, the size of the fiber optic means.

5. The device of claim 4, wherein the plurality of fiber optic means are installed through the tunnels, such that one end of each fiber is exposed in its respective aperture, while the remaining length of the fiber optic means are exposed inside the light tight chamber.

6. The device of claim 5, wherein the constant light-source means is electronically controlled.

7. The device of claim 6 wherein alternatively, the light-source means is a naturally glowing substance such as tritium.

8. The device of claim 7, wherein the light-source is located inside the light tight chamber, and the beam of light is projected into the fiber optic means.

9. The device of claim 8, wherein the fiber optic means are employed as light conductors from the light tight chamber into the output apertures.

10. The device of claim 9, wherein the opaque sleeves means slipped over the fiber optic means, to vary the length of the fiber optic means exposed to the light source.

11. The device of claim 10, wherein the distance of the fiber optic means , from the light source contributes to the attenuation of light collected by the fiber optic means.

12. A method for the generation of a series of very low level light sources ranging over several orders of magnitude, comprising the steps of:

a) providing a light tight chamber connected to a plurality of output apertures through a plurality of tunnels;

b) providing optical fiber to collect the light available in the light tight chamber and conduct the light into the output apertures;

c) providing adjustable opaque or semi opaque sleeves for controlling the amount of light to be collected by the optical fiber.

13. A method of claim 12 for the generation of a series of very low level light sources ranging over several orders of magnitude, employing optical fiber for the collection of light from a light source, along the length of optical fiber means.

14. A method of claim 13 for the generation of a series of very low level light sources ranging over several orders of magnitude, employing adjustable opaque or semi opaque sleeves, for controlling the amount of light collected along the length of the optical fiber means.

15. A method of claim 14 for the generation of a series of very low level light sources ranging over several orders of magnitude, employing the optical fiber means, to conduct light collected in the light tight chamber, to the output apertures, through a plurality of tunnels.

* * * * *